United States Patent
Kumar

(10) Patent No.: US 9,235,641 B1
(45) Date of Patent: Jan. 12, 2016

(54) METHOD AND APPARATUS FOR ARCHIVE PROCESSING OF ELECTRONIC MESSAGES

(75) Inventor: Anil Kumar, Nashua, NH (US)

(73) Assignee: EMC Corporation, Hopkinton, MA (US)

( * ) Notice: Subject to any disclaimer, the term of this patent is extended or adjusted under 35 U.S.C. 154(b) by 866 days.

(21) Appl. No.: 11/784,963

(22) Filed: Apr. 10, 2007

Related U.S. Application Data

(60) Provisional application No. 60/898,752, filed on Jan. 31, 2007.

(51) Int. Cl.
*G06F 17/30* (2006.01)

(52) U.S. Cl.
CPC .............. *G06F 17/30864* (2013.01)

(58) Field of Classification Search
CPC ................................. G06F 17/30864
USPC .................. 707/661, 999.204, 665–668; 711/161–162
See application file for complete search history.

(56) References Cited

U.S. PATENT DOCUMENTS

| | | | | |
|---|---|---|---|---|
| 5,613,108 | A * | 3/1997 | Morikawa | 1/1 |
| 5,632,018 | A * | 5/1997 | Otorii | 709/200 |
| 5,890,163 | A * | 3/1999 | Todd | 1/1 |
| 7,370,034 | B2 * | 5/2008 | Franciosa et al. | 707/749 |
| 7,441,153 | B1 * | 10/2008 | Chitre et al. | 714/38 |
| 8,244,792 | B2 * | 8/2012 | Boaz et al. | 709/200 |
| 2002/0029350 | A1 * | 3/2002 | Cooper et al. | 713/200 |
| 2002/0042815 | A1 * | 4/2002 | Salzfass et al. | 709/206 |
| 2004/0167941 | A1 * | 8/2004 | Prahlad et al. | 707/204 |
| 2005/0086224 | A1 * | 4/2005 | Franciosa et al. | 707/6 |
| 2005/0086231 | A1 * | 4/2005 | Moore | 707/100 |
| 2005/0149584 | A1 * | 7/2005 | Bourbonnais et al. | 707/204 |
| 2006/0059061 | A1 * | 3/2006 | Oey | 705/35 |
| 2006/0075051 | A1 * | 4/2006 | Jain et al. | 709/206 |
| 2006/0143691 | A1 * | 6/2006 | Peterson et al. | 726/2 |
| 2006/0149796 | A1 * | 7/2006 | Aalmink | 707/204 |
| 2006/0200508 | A1 * | 9/2006 | Telkowski et al. | 707/204 |
| 2007/0038884 | A1 * | 2/2007 | Campbell et al. | 714/4 |
| 2007/0078900 | A1 * | 4/2007 | Donahue | 707/200 |

OTHER PUBLICATIONS

"Review: Outlook Email Archive 1.9" by Gregory Tetrault, published Dec. 12, 2005 (http://web.archive.org/web/20051212183230/http://www.atpm.com/6.11/oe-archive.shtml.).*

(Continued)

*Primary Examiner* — Alexey Shmatov
(74) *Attorney, Agent, or Firm* — Dergosits & Noah LLP; Todd A. Noah

(57) ABSTRACT

A method and system for detection, storage and/or display of archive tracking information regarding archiving process history for archived and/or non-archived messages (e.g., email messages). Such information may be useful in determining reasons why a message, or group of messages, was archived or not, and thereby assessing the functioning of an archiving system. The process history information may include a processing type for the electronic message indicating whether the message was archived or not, and if the message was not archived, may indicate whether the message is a duplicate of another archived message, the message was filtered, or the archiving of the message failed. Event data may be recorded indicating a detailed reason why a message was not archived, a current location of the message, one or more rules applied to the electronic message during an archival filtering operation, and/or one or more rules that caused the electronic message to be selected for archiving.

26 Claims, 16 Drawing Sheets

(56) References Cited

OTHER PUBLICATIONS

"Unpacking of archive failed on file /etc/rhgb/temp:cpio:lsetfilecon". A post by Dave Mitchell on Fedoraforum.org. http://forums.fedoraforum.org/showthread.php?t=135639.*

"Unpacking of archive failed on file /etc/rhgb/temp:cpio:lsetfilecon". A post by Dave Mitchell on Fedoraforum.org. http://forums.fedoraforum.org/showthread.php?t=135639; Nov. 7, 2006.*

* cited by examiner

FIG. 2

Archive Process Summary report interface

Archive Process Summary

Report Details

Execution Details
| Report | Jan. 20, 2007 13:52:57 |
| Date Bit Count | 6 |

Data Source Details

Report Configuration
| Processed From | Dec 27, 2006 00:00:00 |
| Processed To | Jan 14, 2007 23:59:59 |
| Processing System | All |
| Message Source | All |

| Processing Date | Processing System | Server/Source | Processed | Archived | Duplicates | Filtered | Failed Archival |
|---|---|---|---|---|---|---|---|
| | | | 1873 | 919 | 861 | 89 | 10 |
| Dec 29, 2006 | | | 249 | 133 | 86 | 20 | 10 |
| | Journaling | | 168 | 92 | 48 | 20 | 10 |
| | | EARTH2003/JournalMbx1 | 99 | 45 | 36 | 10 | 8 |
| | | EARTH2003/JournalMbx2 | 44 | 26 | 11 | 5 | 2 |
| | | mars/fedoration/exjournal.nsf | 25 | 21 | 0 | 5 | 0 |
| | Exchange | | 66 | 26 | 40 | 0 | 0 |
| | | RIGELVM/Group/Series Archive | 41 | 26 | 15 | 0 | 0 |
| | | RIGELVM/Stuart Shortcut | 25 | 0 | 25 | 0 | 0 |
| | SMTP Mailout | | 15 | 15 | 0 | 0 | 0 |
| | | RIGELVM/Virelpathmailout/Extende dOrgs | 15 | 15 | 0 | 0 | 0 |
| Dec 28, 2006 | | | 97 | 4 | 93 | 0 | 0 |
| | Journaling | | 97 | 4 | 93 | 0 | 0 |
| | | EARTH2003/JournalMbx2 | 32 | 2 | 30 | 0 | 0 |
| | | EARTH2003/JournalMbx1 | 65 | 2 | 63 | 0 | 0 |
| Dec 27, 2006 | | | 53 | 30 | 7 | 16 | 0 |
| | Journaling | | 53 | 30 | 7 | 16 | 0 |
| | | EARTH2003/JournalMbx1 | 46 | 23 | 7 | 16 | 0 |
| | | EARTH2003/JournalMbx2 | 7 | 7 | 0 | 0 | 0 |
| Jan 11, 2007 | | | 205 | 86 | 66 | 53 | 0 |
| | Journaling | | 164 | 56 | 55 | 53 | 0 |
| | | EARTH2003/JournalMbx2 | 48 | 18 | 12 | 18 | 0 |
| | | EARTH2003/JournalMbx1 | 71 | 5 | 43 | 23 | 0 |
| | | mars/fedoration/exjournal.nsf | 45 | 33 | 0 | 12 | 0 |

FIG. 4A

| Processing Date | Processing System | Server/Source | Processed | Archived | Duplicates | Filtered | Failed Archived |
|---|---|---|---|---|---|---|---|
| | EmailXtract | | 18 | 10 | 8 | 0 | 0 |
| | | RIGELVM\AlanaGaymon-UDA | 4 | 4 | 0 | 0 | 0 |
| | | RIGELVM\User1 Archive | 6 | 2 | 4 | 0 | 0 |
| | | RIGELVM\AlanaGaymon-UDA | 4 | 0 | 4 | 0 | 0 |
| | | RIGELVM\AlanaGaymon-UDA | 4 | 4 | 0 | 0 | 0 |
| | SMTP Mailbox | | 23 | 20 | 3 | 0 | 0 |
| | | RIGELVM\C:\inetpub\mailroot\NEsidends\Drop | 23 | 20 | 3 | 0 | 0 |
| Jan 10, 2007 | | | 314 | 168 | 146 | 0 | 0 |
| | Journaling | | 202 | 108 | 94 | 0 | 0 |
| | | EARTH2003\JournalMbx1 | 109 | 34 | 75 | 0 | 0 |
| | | EARTH2003\JournalMbx2 | 93 | 74 | 19 | 0 | 0 |
| | EmailXtract | | 80 | 40 | 40 | 0 | 0 |
| | | RIGELVM\DistList Archive | 50 | 25 | 25 | 0 | 0 |
| | | RIGELVM\DistList Archive | 30 | 15 | 15 | 0 | 0 |
| | SMTP Mailbox | | 32 | 20 | 12 | 0 | 0 |
| | | RIGELVM\C:\inetpub\mailroot\NEsidends\Drop | 32 | 20 | 12 | 0 | 0 |
| Jan 9, 2007 | | | 961 | 498 | 463 | 0 | 0 |
| | Journaling | | 368 | 204 | 164 | 0 | 0 |
| | | EARTH2003\JournalMbx1 | 180 | 58 | 122 | 0 | 0 |
| | | EARTH2003\JournalMbx2 | 125 | 83 | 42 | 0 | 0 |
| | | mars/federation/hesicuonal.nsf | 63 | 63 | 0 | 0 | 0 |
| | EmailXtract | | 593 | 294 | 299 | 0 | 0 |
| | | RIGELVM\DistList Archive | 62 | 16 | 46 | 0 | 0 |
| | | RIGELVM\NoreenFitzeo-Archive | 301 | 230 | 71 | 0 | 0 |
| | | RIGELVM\DarylEBehra-Archive | 148 | 3 | 145 | 0 | 0 |
| | | RIGELVM\User1 Archive | 25 | 25 | 0 | 0 | 0 |
| | | RIGELVM\User1 Shortcut | 41 | 10 | 31 | 0 | 0 |
| | | RIGELVM\AlanaGaymon-UDA | 1 | 1 | 0 | 0 | 0 |
| | | RIGELVM\AlanaGaymon-UDA | 1 | 1 | 0 | 0 | 0 |
| | | RIGELVM\AlanaGaymon-UDA | 1 | 1 | 0 | 0 | 0 |
| | | RIGELVM\AlanaGaymon-UDA | 1 | 1 | 0 | 0 | 0 |
| | | RIGELVM\AlanaGaymon-UDA | 1 | 1 | 0 | 0 | 0 |
| | | RIGELVM\AlanaGaymon-UDA | 1 | 1 | 0 | 0 | 0 |
| | | RIGELVM\AlanaGaymon-UDA | 10 | 4 | 6 | 0 | 0 |

FIG. 4B

| Message Date | From | Message Subject |
|---|---|---|
| Dec 29, 2006 16:11:05 | Shane K. Warne | [Mcpt 5] sector |

Message Details:

| Type | Email |
|---|---|
| Attachments: | 5 |
| Size(Bytes): | 1913 |
| To | Noreen E Petra |
| From | Shane K. Warne |

Diagnostic Details:

| Source: | JournalMbx1 |
|---|---|
| EX Message ID | 48E6D61B07E72AF3704C241 |
| MD5HashKey | -9187780082213311125 |
| TimeStamp | 1168908865 |
| EX Tracking ID | F8A61C48E791BD0F |

Processing Details:

| Failed archival | Date | 12/29/2006 11:11:18 AM |
|---|---|---|
| | Processing System | Journaling |
| | EX Server | RCELV8 |
| | Message Source | JournalMbx1 |
| | Event Data | EventData: Failed to Unpack Mail Message: 8 \Program Files\GTG\EmailXtender\EmailVault\logdbn\2006\12\31\5613\2E38 A848 6CX448E24 19807E72AF31B4 C241.msg |
| Collected by rules | Date | 1/3/2007 6:31:18 PM |
| | Processing System | Journaling |
| | EX Server | RCELV8 |
| | Message Source | JournalMbx1 |
| | Event Data | Collected in EmailVaultIndex1 Year > Rule matched: If No rules configured Then include |
| | | Collected in EmailVaultIndex5 Year > Rule matched: If No rules configured Then include |

| Message Date | From | Message Subject |
|---|---|---|
| Dec 28, 2006 19:11:36 | Shane K. Warner | [Nsg# 9] address resolution protocol |

Message Details:

| | |
|---|---|
| Type | Email |
| Attachments | 0 |
| Size(Bytes) | 1664 |
| To | Christian G Gaston, |
| From | Shane K. Warner |

Diagnostic Details:

| | |
|---|---|
| Source | JournalMbx1 |
| EX Message ID | 460ED51AE7240BEA0CC4718 |
| MD5HashKey | -1791067620383956 |
| TimeStamp | 116903695 |
| EX Tracking ID | A0078116389D406 |

| Message Date | From | Message Subject |
|---|---|---|
| Dec 29, 2008 16:11:00 | | (illegible) |

Message Details:
| Type | Email |
|---|---|
| Attachments | 2 |
| Size(Bytes) | 2074 |

Diagnostic Details:
| Source | JournalMbx1 |
|---|---|
| EX Message ID | 48DED81A6A7C11A08EC60A |
| MD5HashKey | 55Cb19576404016934B |
| TimeStamp | 1196503866 |
| EX Tracking ID | 49C0FC896686C36 |

Processing Details:
| Failed archival | Date | 1/29/2009 11:11:20 AM |
|---|---|---|
| | Processing System | Journaling |
| | EX Server | PACELV8 |
| | Message Source | JournalMbx1 |
| | Event Data | EventData: Failed to Unpack Mail Message: E:\Program Files\OPG\EmailSnender\EmailVault\Cexp\0x4C001C9185079314.MAILBOX=48DED81A6A7C11A08EC 6C04.msg |

FIG. 5H

Message Details Report interface

Message Details

Report Details:

Execution Details

| Report Date | 1/29/2007 2:33:07 PM |
|---|---|
| Message Count Limit | 100 |
| Messages Retrieved | 5 |

Report Configuration

| EX Message ID | |
|---|---|
| EX Tracking ID | |
| Processed From | 12/29/2006 12:00:00 AM |
| Processed To | 12/29/2006 11:59:59 PM |
| Message Source | EX:"JournalMbx1"<o=federation/ou=first administrative group/cn=recipients/cn=jnlmbx1> |
| Processing System | Journaling |
| Processing Type | Failed archival |
| Show Message Owners | From, To |
| Show Details | Message Details, Processing Details |

FIG. 7

METHOD AND APPARATUS FOR ARCHIVE PROCESSING OF ELECTRONIC MESSAGES

This application claims the benefit of U.S. provisional application 60/898,752, filed Jan. 31, 2007, which is hereby incorporated by reference in its entirety.

BACKGROUND

Electronic messages are widely used and may take different forms (e.g., email messages, news updates, RSS or other feeds, etc.). Frequently, there is a need to store a backup or other type of copy of messages, e.g., to provide redundancy to help ensure that a message is available for later use and/or to free up storage space used by a message handling system (such as an email server or other email handling system) by offloading messages to another storage location. This type of storage is commonly called archiving, and various applications have been developed to archive messages, such as email messages.

BRIEF DESCRIPTION OF THE DRAWINGS

Aspects are described with reference to the following drawings in which like numerals reference like elements, and in which:

FIG. 2 shows a record of archive tracking information for a message in an illustrative embodiment;

FIGS. 4A and 4B show a report of summarized archive tracking information for a plurality of messages;

Figure 5B:
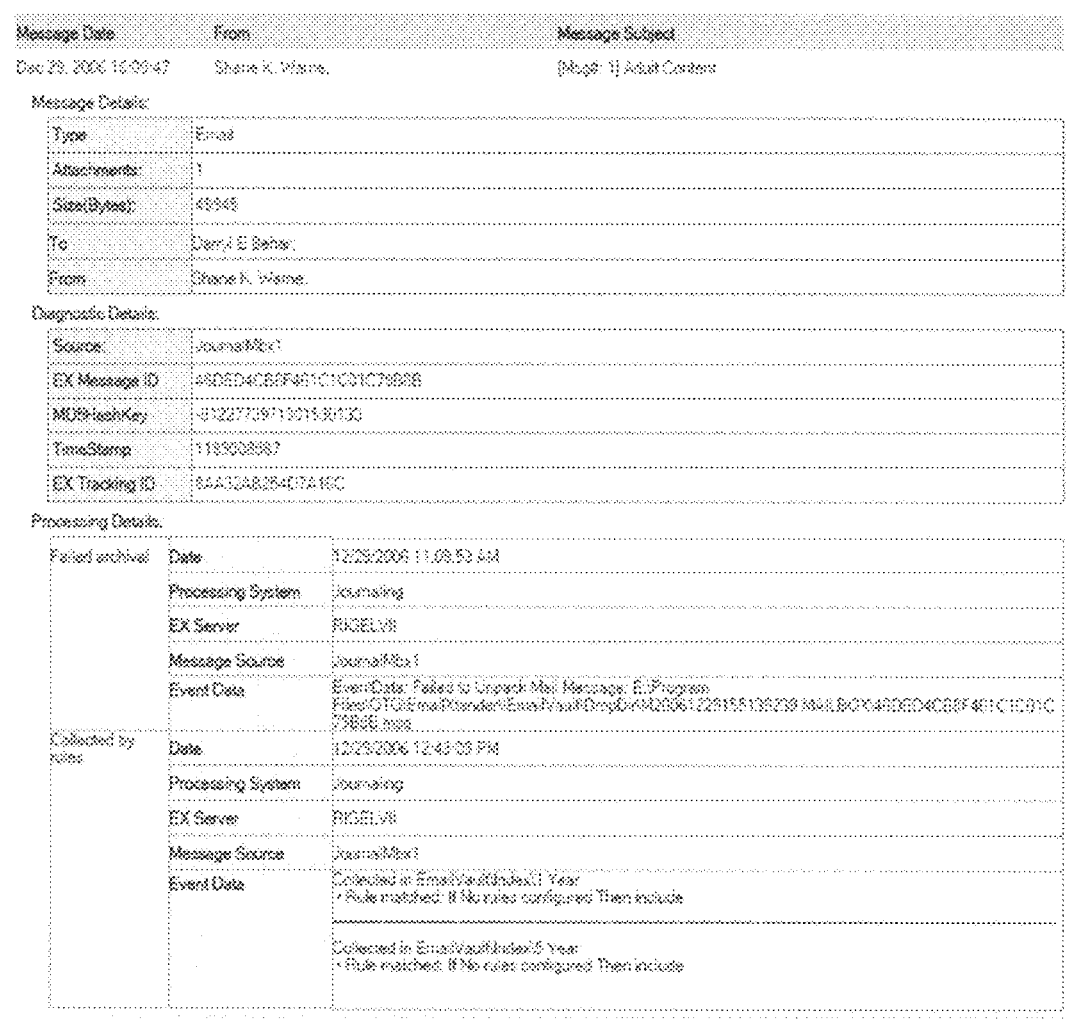
Figure 5C:
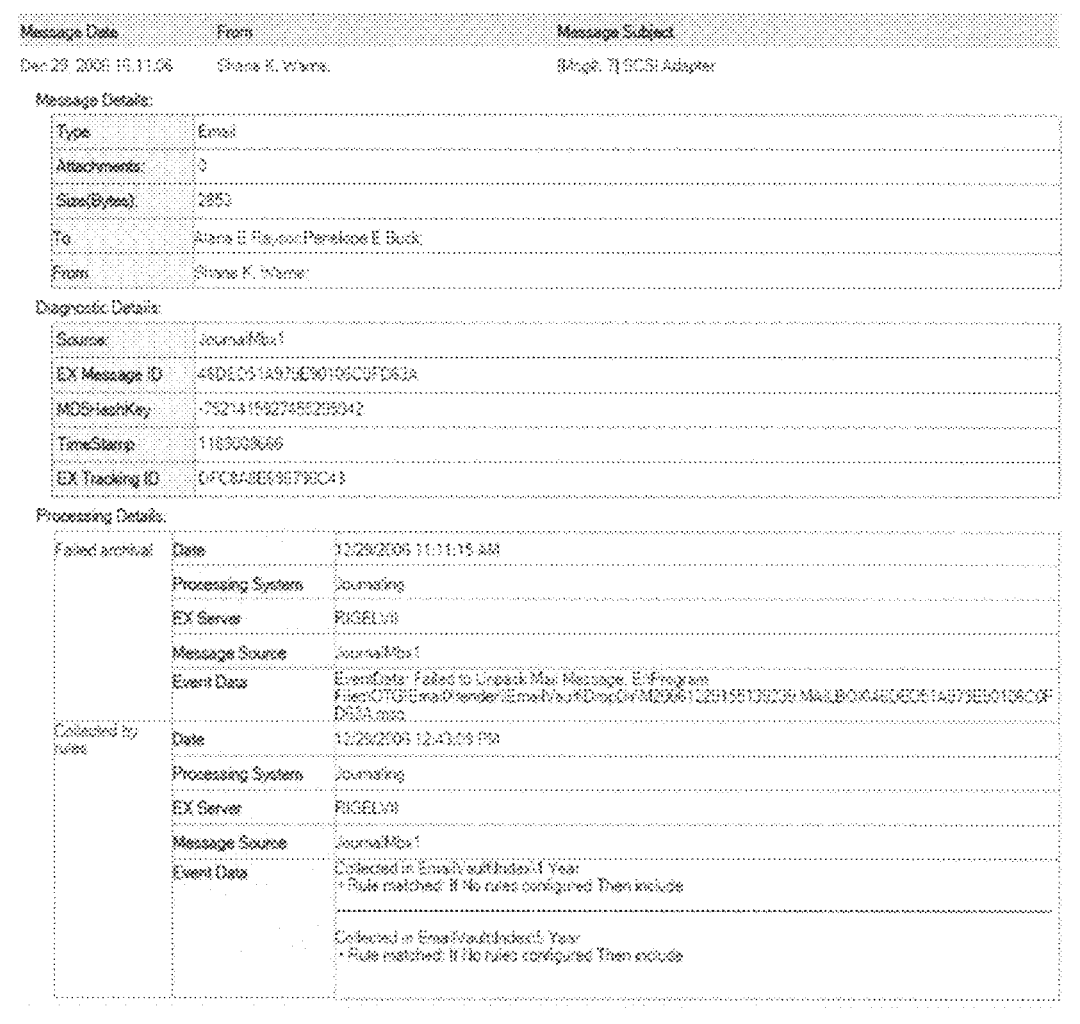
Figure 5E:
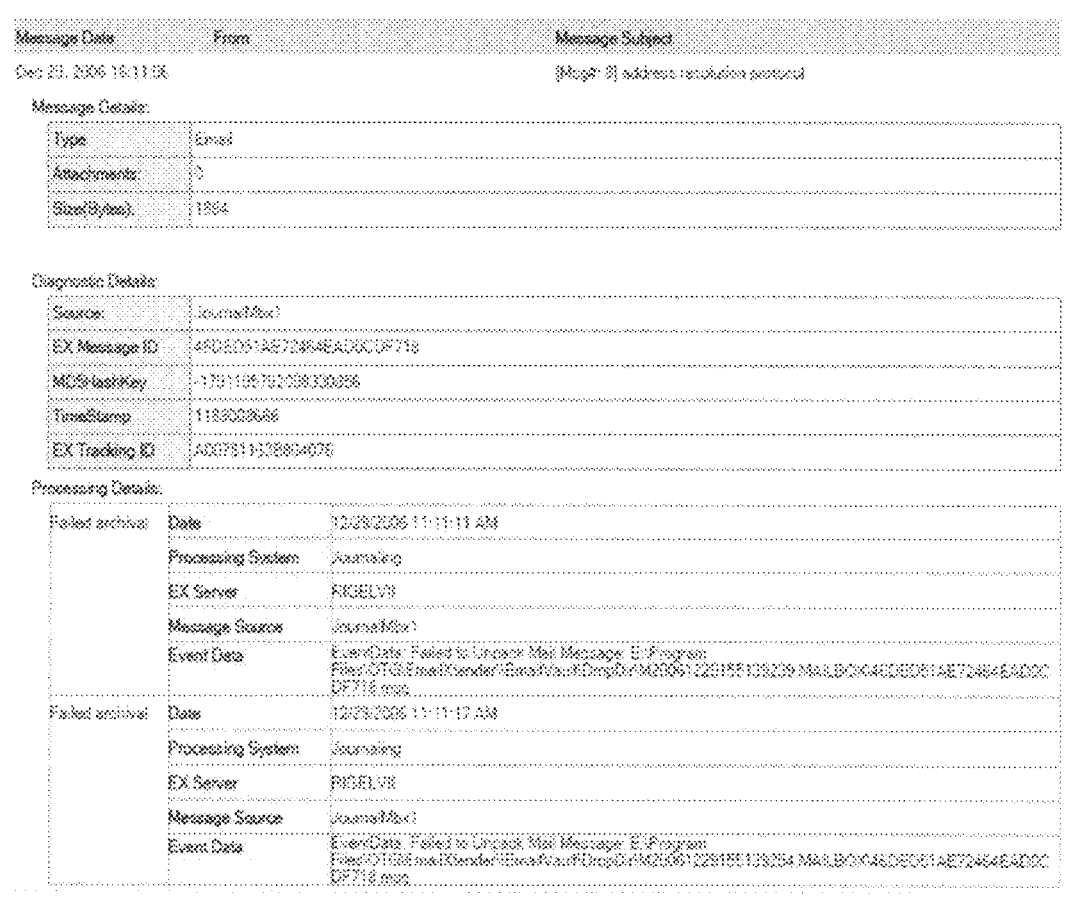
Figure 5F:
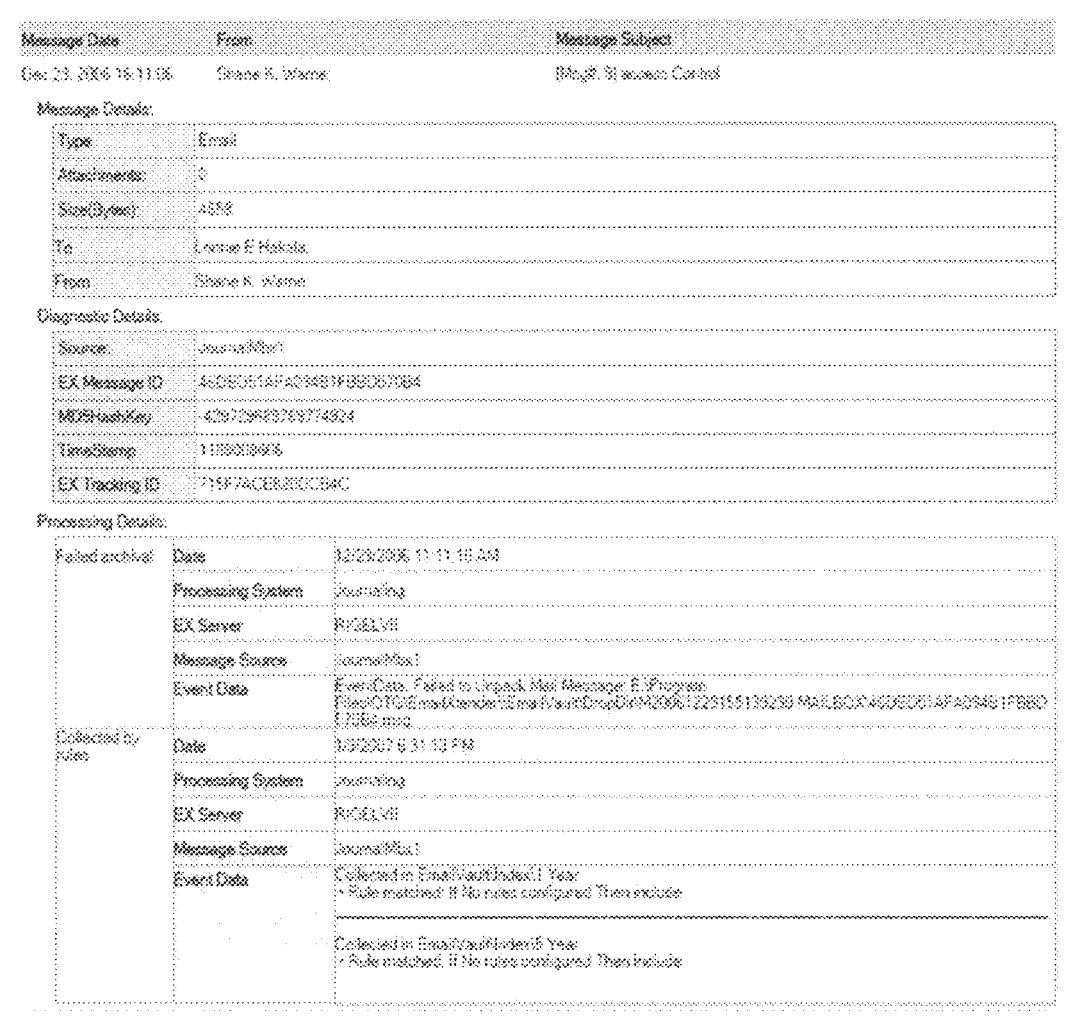

FIGS. 5A-5H show reports of archive tracking information for a plurality of individual messages meeting specified criteria;

FIG. 7 shows a summary report of archive tracking information relating to messages meeting the criteria shown in FIG. 6 in this illustrative embodiment;

DETAILED DESCRIPTION

Figure 1:
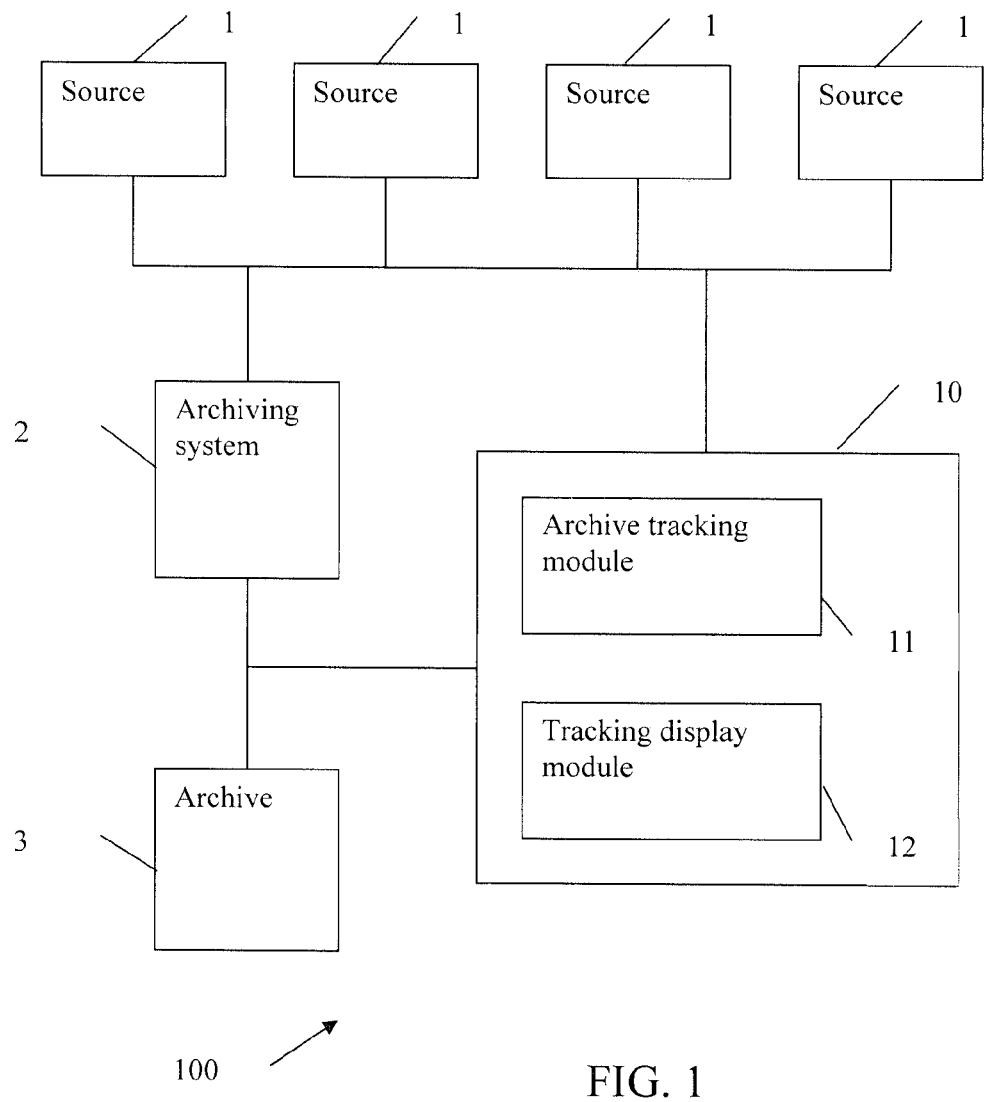
FIG. 1 is a schematic block diagram of a computer system in which aspects of the invention are implemented in an illustrative embodiment.

The inventors have appreciated that although message archiving systems can be effective in identifying messages for archiving and actually archiving the messages, it would be desirable to allow for the recordation of actions of an archiving system in archiving messages (or not), and if appropriate, why certain messages were archived or not archived. For example, some messages may include valuable information that would be difficult or impossible to recreate if deleted from a computer system or otherwise lost. Users may wish to actually verify that such messages have been archived. In other cases, regulatory or other government agencies may require entities to store messages for a particular amount of time to comply with various rules and regulations, such as those imposed by the Securities and Exchange Commission (SEC) and others. These agencies and other bodies may require that an entity prove that appropriate archiving protocols have been implemented and are operating properly. Accordingly, aspects of the invention allow for tracking of message archive processing.

Aspects of the invention allow for detection and storage of archive tracking information regarding archiving process history for messages (e.g., email messages). As used herein, a "process history" for a message is information representing actions taken (or not), results of actions taken, decisions made, and/or criteria used in decision making by an archiving system and/or a message handling system when processing messages for archival purposes. In one embodiment, process history for messages may be captured and stored for messages regardless of whether the messages are archived or not. As used herein, "archiving" a message on an archive system involves receiving at least a portion of a message from a system that manages the message (e.g., an email server, so that the received information can be removed from the message handling system), and storing suitable information so that some or all of the content of the message, such as the entire text and/or attachments of an email message, can be later restored to the message handling system In some embodiments, a complete audit trail of the archive processing of messages can be captured and stored (or otherwise generated) regardless of the final archive state of each of a plurality of messages. Such aspects of the invention may allow for the later identification of messages that were not archived, as well as reasons why the non-archived messages were not archived. This feature may be useful, for example, when verifying the proper operation of filtering, routing and/or other rules used to identify messages for archiving. By reviewing information concerning messages that were not archived along with the related archive process history, (e.g., for any messages that should have been archived but were not), one may be able to identify faulty rules or other aspects of an archiving system that should be corrected or otherwise adjusted. This feature may also allow for the verification that messages that should have been properly archived were in fact archived, and messages that need not have been archived were not. This type of verification may be useful in proving to government authorities, such as securities regulators, a court of law and/or other entities that appropriate document retention policies have been complied with.

In another aspect of the invention, information regarding the archive process history and other related information may be displayed, e.g., for visual review by a user. In one embodiment, a user may be presented with details regarding a total number of messages that were processed by an archiving system for specified periods of time (e.g., a specified number of days). Along with the total messages processed for a given time period (e.g., each day), the user may be presented with the number of messages that were archived and the number of messages that were not archived for the time period. Of those messages not archived, the display may include information regarding why the messages were not archived, e.g., the message could not be retrieved or some other archiving failure, the message failed to meet some requirement for archiving such as not meeting the criteria of one or more rules applied to messages to determine whether the message should be archived, and/or the message was a duplicate of a message that was already archived. Such information may allow a user to verify how many messages were not archived, and precisely why the messages were not archived. For example, large numbers of email messages not archived because of a failure to be able to retrieve the messages from storage may indicate a system problem that requires repair. Large numbers of email messages that are not archived because they were filtered out may prompt review of the rules being applied to verify that they are appropriately configured, and so on.

In one aspect of the invention, the display of archive process history may include links to corresponding more detailed archiving information. For example, a displayed number of email messages that were not archived because the messages were filtered out may include a link. By activating the link, e.g., by clicking on the displayed number, a display of more detailed archive information for each email message that was filtered out and therefore not archived may be displayed. This feature may allow a user to more easily and readily review archiving information, e.g., to confirm that the filtering rules are operating properly.

Various aspects of the invention are described below with reference to illustrative embodiments. However, it should be understood that aspects of the invention are not limited to those embodiments described below, but instead may be used in any suitable system or arrangement. Also, although embodiments below may include several aspects of the invention, various aspects of the invention may be used alone and/or in any suitable combination with other aspects of the invention.

FIG. 1 shows an illustrative computerized environment on which aspects of the invention can be implemented. This embodiment includes a computer system 100 having a plurality of message sources 1, which may include any suitable logical or physical locations for messages, including one or more individual email mailboxes, a journaling mailbox, a file, folder or other location internal or external to an email message system (such as a Lotus Notes folder), and/or an SMTP directory. The messages associated with the sources 1 may be handled using any suitable system, such as an email server or other message handling system (like Exchange or Domino), or other. The computer system 100 may also include any other suitable hardware (such as one or more general purpose programmable computers in the form of PDAs, laptop computers, servers, cellular telephones, and so on), software (which may operate on one or more computers or other devices), communication systems (such as the Internet, one or more wired or wireless local area networks (LANs), a telephone network, etc.), and any other suitable components or devices.

The computer system 100 may include, or interact with, a message archiving system 2 that is arranged to archive messages from one or more sources 1, e.g., the archiving system 2 may store a copy of each message from a source 1 in a message archive 3. The message archiving system 2 can be of any suitable type, such as the EmailXtender product provided by EMC Corporation of Hopkinton, Mass., but techniques described herein are not limited to any particular archiving system 2 and/or archive 3. The message archiving system 2 may be arranged in any suitable way to archive messages. For example, the archiving system 2 may store entire messages in the message archive 3, may store portions of messages, may compress one or more portions of archived messages, may store message attachments separately or together with other message portions, may compress or otherwise reduce storage requirements for one or more portions of archived messages, may use any suitable database or other data storage format for archived messages, may index all or parts of messages for use in later searching purposes, and so on. In short, the message archiving system 2 may operate in any suitable way to archive some or all messages from the computer system 100.

Archiving rules may be applied by the archiving system 2 and/or other portions of the computer system, such as the message handling system, to identify messages for archiving and/or to filter messages. For example, a rule may be applied by the message handling system that identifies emails that are older than 3 months, and direct those emails for archiving. Rules applied to messages may involve other actions performed with respect to messages apart from identifying a message for archiving or filtering a message out, e.g., placing the emails in a source 1 after determining the emails should be archived. In another example, instead of applying rules to previously received and/or stored messages, a "journaling" message handling system may operate in real time to identify email messages for archive processing according to a specified set of rules. Another message processing system, an "email extract" system may identify all emails sent to persons in a specified distribution list and designate those emails for archive processing by placing the messages in one or more sources 1. (Of course, messages need not be place in a source 1 for the purpose of being processed by the archiving system 2; instead, the archiving system 2 may process messages from any source 1, regardless of how or why the message was located there.) Yet another processing system, referred to herein as an "SMTP Mailroot" system, may function as an alternate processing system for special messages that are not handled by other processing systems, e.g., non-email messages that are designated for archive processing. In one aspect, the rules applied by the message handling system(s), the archiving system and/or other portions of the computer system 100 may be captured and stored as part of archive tracking information, as discussed in more detail below.

Messages in sources 1 may be processed by the message archiving system 2 for archival purposes, regardless of the reasons why a message was placed in the source 1. In processing messages, the archiving system 2 may or may not apply rules. For example, the archiving system 2 may retrieve and process email messages from sources 1 and determine whether each message should be archived, e.g., by applying one or more rules or other criteria. As with the message handling systems above, the message archiving system 2 may employ any suitable rules or other criteria when identifying messages for archiving and/or performing archiving of the messages, such as archiving only messages received by particular parties and/or that include a particular word or group of words, archiving only messages with a timestamp in a particular range, and so on. Other actions may be performed as part of applying a rule, e.g., a message may be deleted from a source 1 after being archived and a shortcut indication for the message may be provided in the source 1, and so on. Alternately, the archiving system 2 may archive all messages in one or more sources 1 without the application of any rules.

To help prevent the likelihood of having two of the same messages in the message archive 3, in some archiving systems, the archiving system 2 may check whether each message in a source 1 is a duplicate of an already archived message, and if so, may identify that the message not be archived. Determination of whether a message is a duplicate of another archived message may be performed in any suitable way. For example, the archiving system 2 may generate a content-based identification number for a message, and compare the identification number to content-based identification numbers for other messages in the archive 3. If a match is identified, the archiving system 2 may determine that the current message is a duplicate. The content-based identification number may be, for example, an MD5 hash key or the result of another function that generates a unique identifier using the text and/or any other suitable fields or other portions of an email message. Of course, it should be understood that any other suitable technique may be used to identify duplicate messages, such as comparing message portions, comparing other identification numbers (such as identification numbers generated for messages by the message handling system), and so on.

If the archiving system 2 determines that a message should be archived, the message may be stored in any suitable way in the message archive 3. In one illustrative embodiment, the contents of an archived message are stored and are indexed to allow for later searching of archived messages. The message contents and other information relating to the message may be stored in any way, e.g., in a flat file, a database arrangement, or any other data store. Message identifier information may be stored as well. For example, a unique message identification number that is generated based on message content (e.g., by applying a hash function such as MD5 or another function) may be stored (e.g., with other message content and/or in a separate database table or file in the archive 3). This message identifier information may be used later in duplicate checks and/or archive tracking, as discussed above. Optionally, one or more fields of an archived message may be compressed or otherwise processed, e.g., to reduce storage requirements. For example, the body of an email message and/or any attachments may be compressed to reduce the overall storage space needed to maintain archived messages. Other message fields, such as email sender, recipient or subject fields, may or may not be compressed.

In one aspect of the invention, an archive tracking unit 10 may generate archive tracking information that represents, at least in part, an archiving process history of messages processed by the message archiving system 2 and/or the message handling system. The archive tracking information may provide a summary of archive processing, e.g., total numbers of messages processed by the archiving system 2, total numbers of messages archived and not archived, etc. Alternately, or in addition, the archive tracking information may be generated for individual messages, e.g., indicating if the particular message was archived or not, and if not, detailed reasons why such as the message could not be retrieved, the message failed a particular rule or was otherwise filtered, the message was a duplicate of another message, and so on.

As discussed above, the archiving process history may provide an audit trail for messages, allowing a company or other entity to verify the operation of archiving processes and/or the disposition of each message identified for archive processing (e.g., messages placed in a source 1 whether the messages are archived or not). The archiving tracking module 11 may generate and store (in the archive 3 or elsewhere) archiving information for every message processed by the archiving system 2, or for only a subset of messages processed, e.g., only messages that are archived or only messages that are not archived. (As used herein, a non-archived message may be a message that was not identified for archiving, e.g., by the archiving system 2, and/or a message that was identified for archiving, but was not actually archived for whatever reason.) For example, as shown in FIG. 2, the archiving tracking module 11 may generate and store information including all or any subset of the following:

- a type of the electronic message (in this example the "Type" field, e.g., email, RSS feed, etc.);
- a number of attachments to the electronic message (in this example the "Attachments" field);
- a size of the electronic message (in this example the "Size (Bytes)" field);
- "to", "from", "cc" and/or other address information for the electronic message (in this example, the "To" and "From" fields;
- a source of the electronic message (in this example the "Source" or "Message Source" fields, e.g., a server, a mailbox, a folder, or other location in the computer system 100);
- an archiving identification number for the electronic message (in this example the "EX Message ID" e.g., a unique identification number generated by the message handling system that identifies the message uniquely with respect to all other messages in the archive 3);
- a content-derived identification number (in this example the "MD5HashKey" which may be an MD5 hash key generated by performing an MD5 hash on one or more portions of a message's content);
- a time stamp for the electronic message (in this example the "TimeStamp" field);
- a tracking identification number for the electronic message (in this example the "EX Tracking ID" field generated by the message handling system for the system's tracking log);
- a date for the electronic message (e.g., the "Date" field);
- a processing system from which the electronic message obtained (e.g., the "Processing System" field);
- a server from which the electronic message was obtained (e.g., the "EX Server" field);
- a processing type for the electronic message (including, for example, an indication that the message was archived or not archived, and if not archived, the indication representing whether the message is a duplicate of another archived message, the message was filtered, or the archiving of the message failed)(in this example, the processing type is indicated in the leftmost box under "Processing Details" and has a value of "Failed archival"); and/or
- event data regarding the archival processing of the message (including, for example, an indication of why a message was not archived, a current location of the message, one or more rules applied to the electronic message during an archival filtering operation, and/or one or more rules that caused the electronic message to be selected for archiving)(in this example, the "EventData" field).

Figure 2:
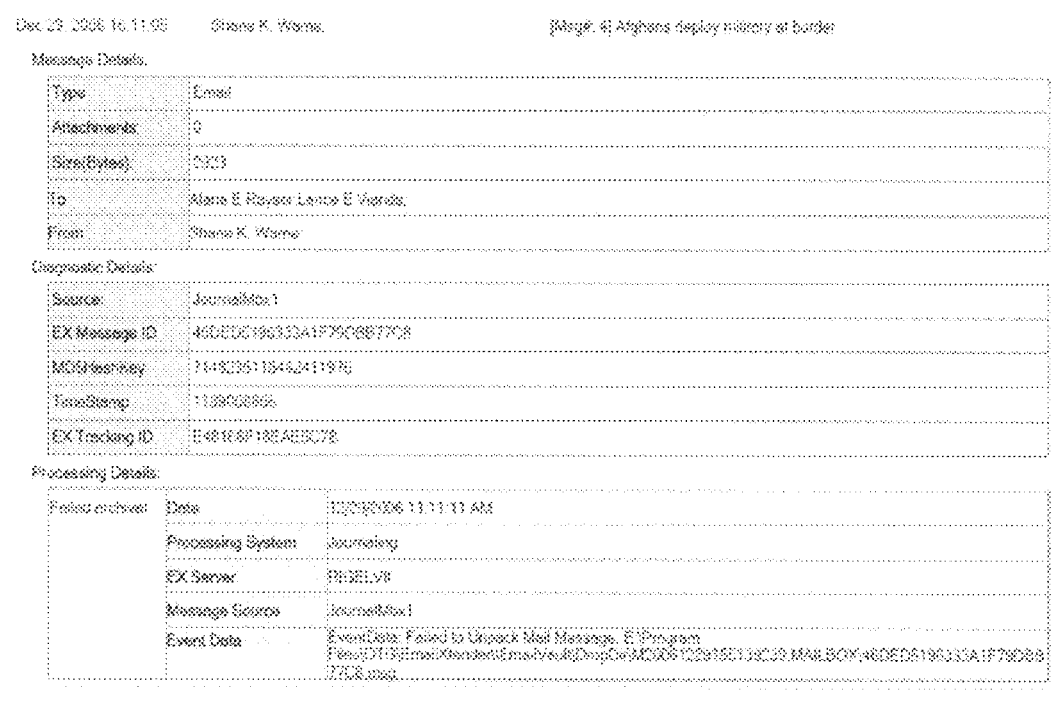

Archiving information such as that shown in FIG. 2 may be generated and stored for each message processed by the message archiving system 2, whether or not the message is archived. For messages that are not archived, the archive process history (e.g., including the processing type, and event data) may be useful when later determining why a particular message was not archived. As discussed in more detail below, the archive tracking module 11 may monitor activity of the archiving system 2 or otherwise receive information regarding archive processing of messages. In response to receipt of such information, the archive tracking module 11 may store the information in a suitable way (such as in a database, with other message information in the archive 3, or other data store) to allow for later retrieval and/or reporting.

In one aspect, a tracking display module 12 that is part of the archive tracking unit 10 may be adapted to generate information for display of statistics or other details regarding message archive processing based on the archive tracking information. The display may be in any suitable form, such as a printed table (like that in FIG. 2), a graphical user interface having one or more computer actuatable links, a graphical chart, and so on. Thus, the display may be presented on conventional sheets of paper, electronic paper, a cathode-ray tube (CRT), LCD or other similar display device, and so on. In one illustrative embodiment, the tracking display module 12 may allow a user to define parameters for an archive tracking information display, e.g., using the dialog box shown in FIG.

3 which in this example is configured to provide archive processing summary information. Using this dialog box, the user may select various parameters for the summary information to be provided, such as a processing date range (e.g., a date range that messages were processed by the archiving system 2), a processing system from which messages originated, a source 1 for the processed messages, and so on. The user (such as a person with administrator-level permission or other suitable permission level) may be enabled to select parameters in any other suitable way, and/or the tracking display module 12 may have "canned" reports, which have parameters pre-set, from which the user may choose for display.

Figure 3:
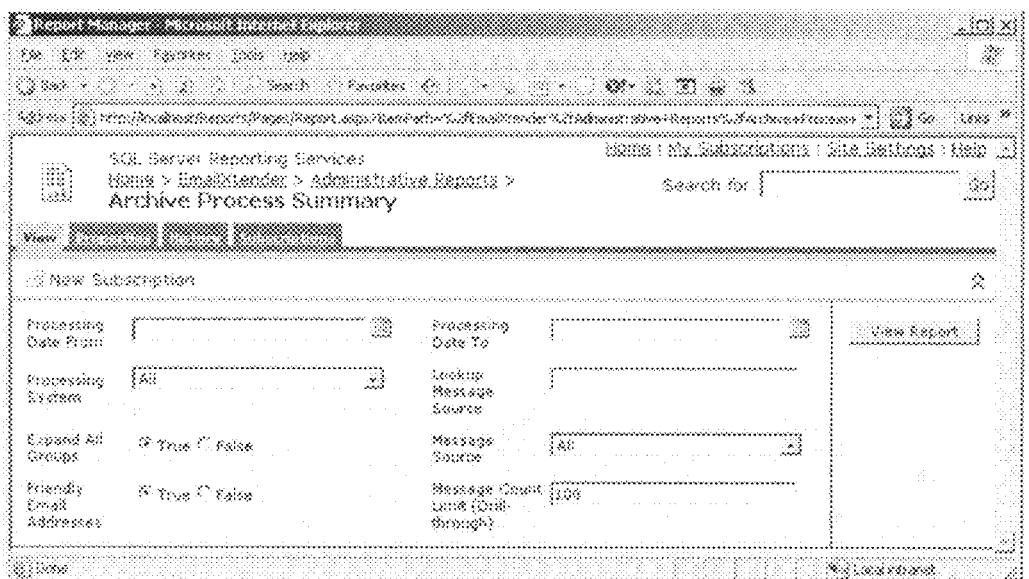
FIG. 3 shows a dialog box for defining parameters for a summary report of archive tracking information.
Figure 3G:
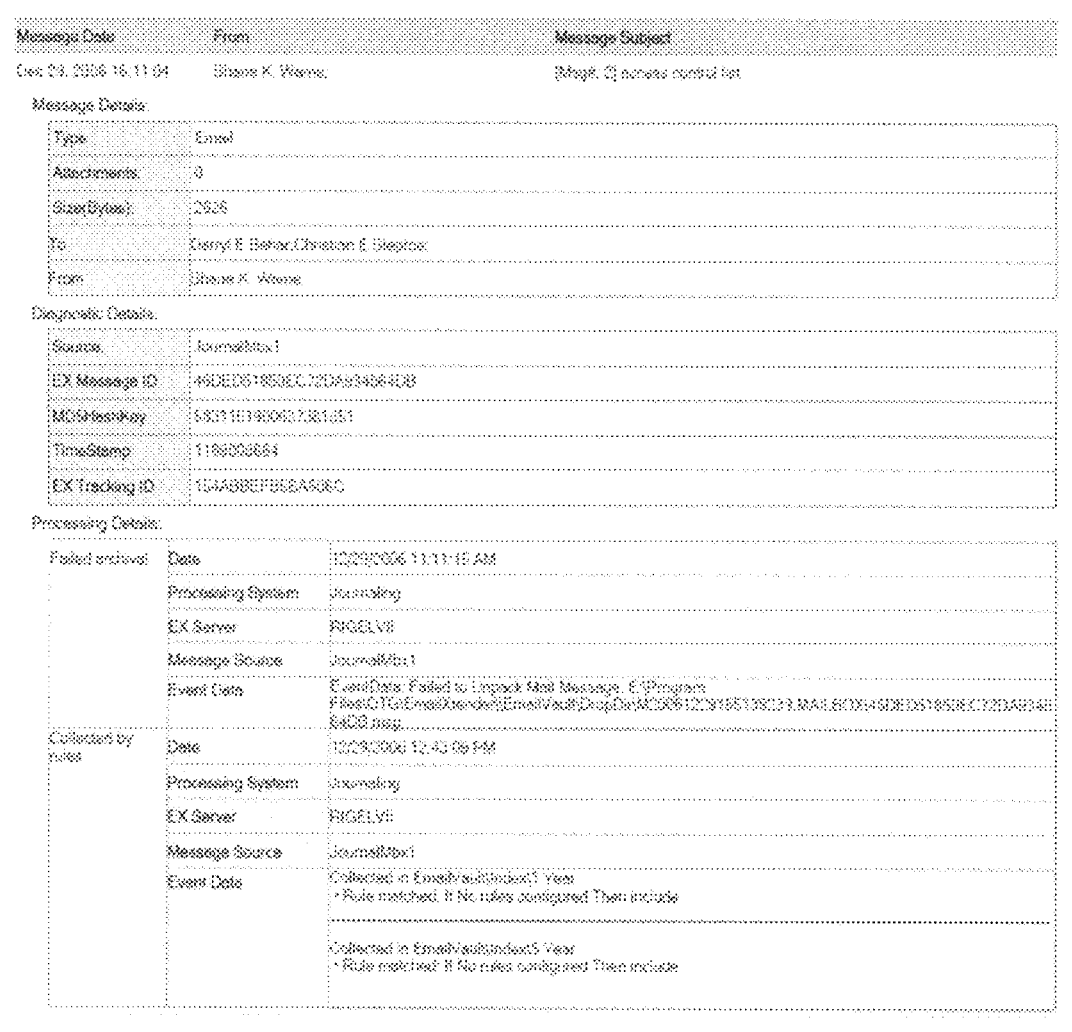

In response to receipt of suitable parameters via the dialog box of FIG. 3 (for example) and/or selection of a pre-defined report, the tracking display module 12 may cause the display of archive tracking information like that shown in FIGS. 4A and 4B. In this illustrative embodiment, FIGS. 4A and 4B constitute a single display of summary tracking information for messages processed in the defined date range for all processing systems and sources 1 for the computer system 100. Although the information displayed may be arranged in any suitable way and may include any type of information, in this illustrative embodiment, an archive tracking information report may indicate, for each period of time (e.g., day) of archive processing, the total number of messages processed, the total number of messages archived, the total number of duplicate messages identified, the total number of filtered messages (e.g., messages not archived because they met or failed to meet the criteria of one or more rules), and the total number of messages for which archiving operations failed. This information may be broken down, as shown, or otherwise organized for each processing system via which messages were supplied from the computer system 100, and further broken down or organized under each processing system for each source 1 of the messages. Thus, information included in the display may relate to one or more of the categories of electronic messages processed by the message archiving system, electronic messages that were archived, duplicate messages, filtered messages, and messages for which archival failed.

The display may include one or more user-activatable links so that a user may readily access desired information relating to a portion of the display. For example, the number of messages that failed to be archived may be associated with a link such that when a user "clicks on" or otherwise selects the associated link, more detailed information regarding the messages that failed archival is displayed. Referring to FIG. 4A, the number of messages that failed archival during processing on Dec. 29, 2006 for the processing system "Journaling" and source "Earth2003\JournalMbx1", i.e., "8", may be selected by the user, causing the tracking output module 12 to generate a display including information such as that shown in FIGS. 5A-5H for each of the 8 messages that failed archival under this criteria. As shown in FIGS. 5A-5H, information in a format such as that shown in FIG. 2 may be displayed for each of the related messages. In addition, information regarding the rules applied to the message which caused the message to be identified for archiving or not may be displayed. (In FIG. 5A, for example, this information is displayed as corresponding to the "EventData" field under the "Collected by rules" field, and indicates that there were no rules configured, and as such, the message was identified for archiving.) Such rules may be applied by the message handling system and/or the archiving system 2, thereby causing the messages to be identified for archival processing or not. As a result, a user may be able to determine how the message was identified for archive processing, if desired. In addition, or alternately, the display may include information that relates to a result of archiving the message by the archiving system 2. (In FIG. 5A, this information is displayed as corresponding to the "EventData" field under the "Failed archival" field, or processing type field, and indicates that the message failed archiving because the email message could not be unpacked from the file indicated.) Such information may aid a user in determining why a particular message was not archived.

Figure 6:
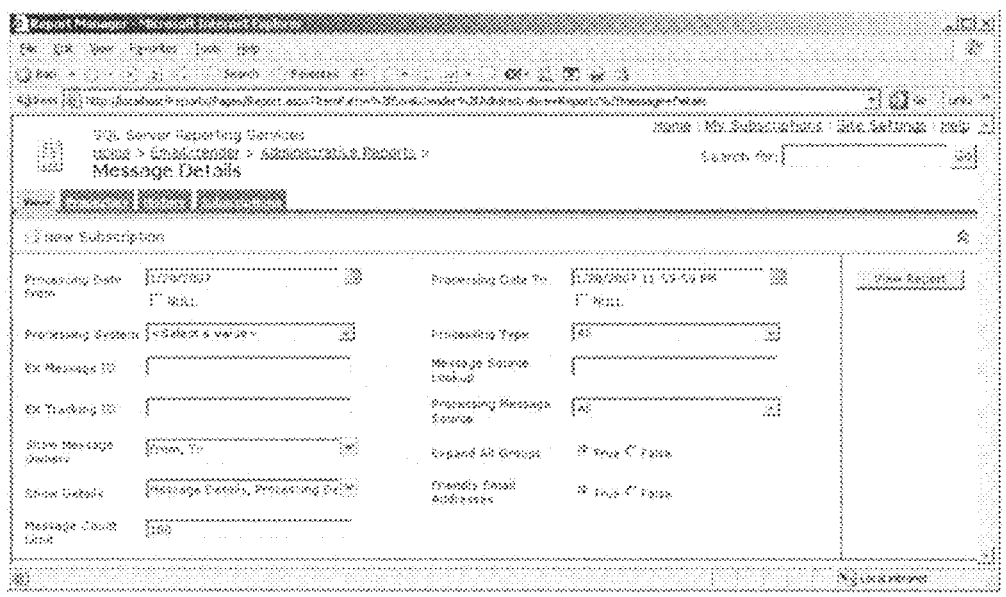
FIG. 6 shows a dialog box for defining parameters for obtaining detailed reports for messages.

The tracking display module 12 may allow a user to obtain the type of message-specific information displayed in FIGS. 5A-5H by other means, such as a dialog box shown in FIG. 6. Using this dialog box, the user may set parameters and cause the tracking output module 12 to display message details according to the specified parameters. For example, if, using the dialog box of FIG. 6, parameters are set to identify messages that failed archival during processing on Dec. 29, 2006 for the processing system "Journaling" and source "Earth2003\JournalMbx1", the tracking output module 12 may generate a display like that in FIG. 7, which indicates the parameters set as well as summary results, i.e., a number of messages meeting the criteria (in this case 8 messages). Following FIG. 7 may be a display like that in FIGS. 5A-5H, providing details for each of the eight messages, or a user may selectively display the details shown in FIGS. 5A-5H, e.g., by clicking on a link associated with the number of messages displayed in FIG. 7, i.e., the "8".

Figure 8:
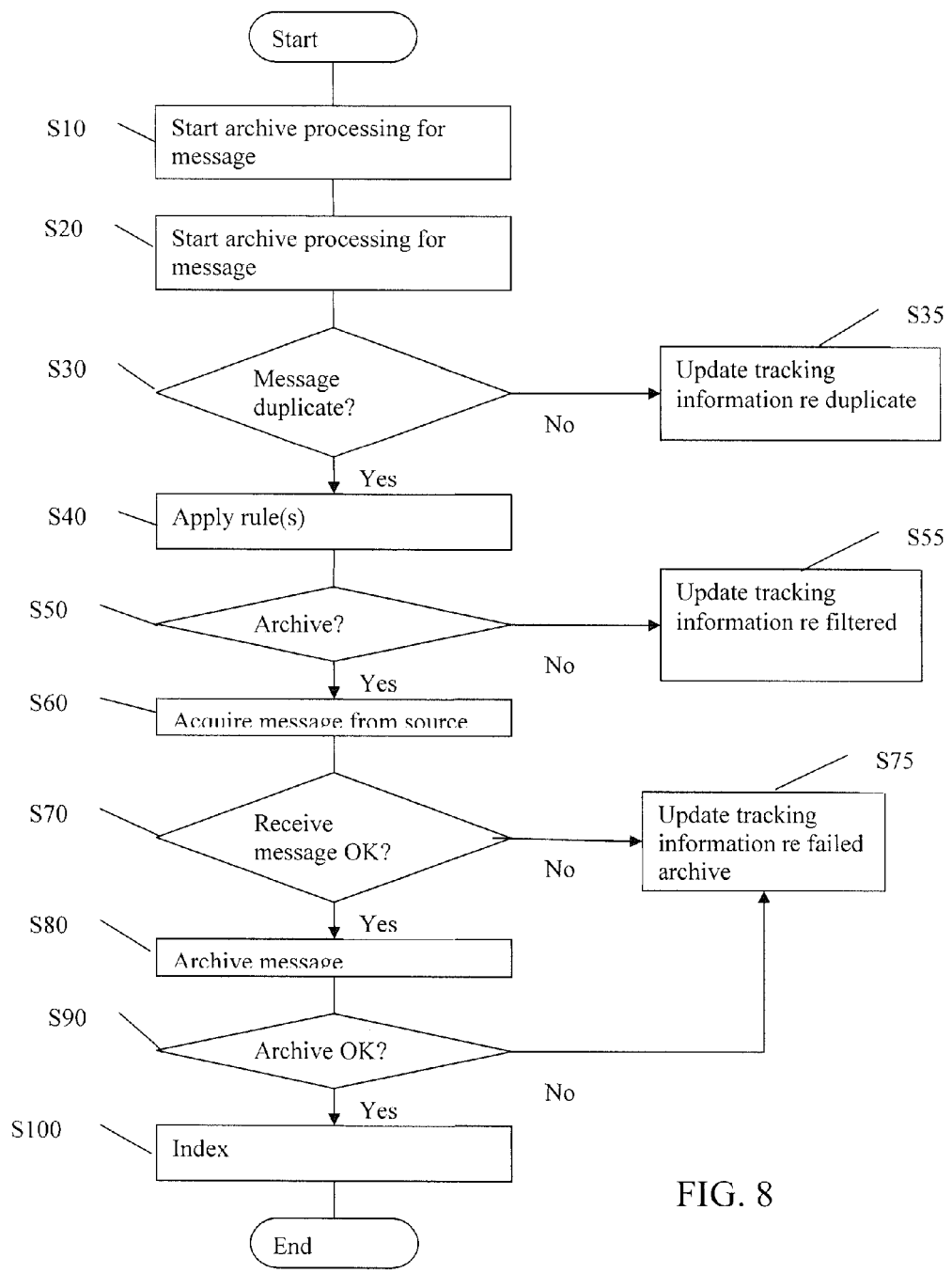
FIG. 8 is a flowchart of steps in a method for processing messages and generating archive tracking information in an illustrative embodiment.

FIG. 8 shows a flowchart of steps in a method that may be employed by the archive tracking unit 10 in an illustrative embodiment. Also shown are steps employed by the archiving system 2 (i.e., on the left side of FIG. 8), since these steps are related to the various steps performed by the archive tracking unit 10.

In step S10, the archiving system 2 may start processing of a new message from a source 1, and then determine in step S20 whether the message is a duplicate of a message that has already been archived. To perform this check, the archiving system 2 may generate an MD5 hash key using all or part of the message's content or otherwise determine an identifier for the message, and compare the hash key or other identifier to those of other archived messages. Using the message referred to in FIG. 2 as an example, the archiving system 2 may use the identification number from the EX Message ID field, the MD5HashKey field, the Timestamp field, the EX Tracking ID field or other suitable information, such as one or more portions of the message content. If the message is determined to be a duplicate in step S30, the archiving tracking module 11 may update archive tracking information for the message accordingly in step S35, e.g., increment a "Duplicate" count included in summary archive tracking information by one and update a record for the message maintained by the archiving tracking module 11. The archiving tracking module 11 need not maintain summary tracking information, e.g., counts of total messages processed, total messages archived/not archived, etc., but instead may determine this information as needed from individual message records. Update of the tracking information record for the message may include providing suitable information in the Processing Type field for the message to indicate that the message is a duplicate and/or providing information in the EventData field to indicate the duplicate message. The record for the message may take any suitable form, such as a database record or other arrangement. Other information for the message record (such as the message type, sender/recipient information, etc.) may be obtained by the archive tracking module 11 from the message directly (e.g., in the source 1), from the message handling system and/or from the archiving system 2. The archive tracking module 11 may generate and maintain records for all messages in one or more sources, or may create message records or otherwise generate archive tracking information only when messages are processed by the archiving system 2. Other steps (not shown) may be performed by the archiving system 2 and/or the message handling system after determination that the message is a duplicate, e.g., the message may be deleted from the source 1, in response to determining that the message is a duplicate.

In step S40, if the message is not a duplicate, the archiving system 2 and/or a message handling system may apply one or more rules or other criteria to the message to determine if the message should be archived or not. The rules or other criteria may take any suitable form. For example, the archiving system 2 may apply rules such as only messages from a particular set of sources 1 are archived, only messages received by a particular set of entities are archived, and so on. Rules and other criteria implemented by the archiving system 2 may be in addition to or in place of rules and/or other criteria used by the message handling system when determining whether to identify the message for archiving, e.g., by placing the message in a source 1. Thus, for example, a determination whether to archive a message may be made by the message handling system, e.g., by the application of one or more rules, and only messages identified for archiving may be placed in a source 1. Thereafter, the archiving system 2 may archive all messages in one or more sources 1. Alternately, rules may be additionally, or exclusively, applied by the archiving system 2.

If the message is determined to not be archived in step S50, the archiving tracking module 11 in step S55 may update archive tracking information accordingly, e.g., increment a "Filtered" count included in summary archive tracking information by one and update a record for the message. Updating of a tracking information record for the message may include providing suitable information in the Processing Type field for the message to indicate that the message is a "filtered" message and/or providing information in the EventData field to indicate the filtering rule applied. Other steps (not shown) may be performed by the archiving system 2 and/or the message handling system, e.g., the message may be deleted from the source 1.

If the message is identified for archiving in step S50, the archiving system 2 may attempt to acquire the message from the source 1 in step S60. If the message is not properly received, in step S70 the archiving tracking module 11 may update archive tracking information accordingly, e.g., increment a "Archive Failed" count included in summary archive tracking information by one. Other archive tracking information may be generated as well, such as information related to an "EventData" field for the message that indicates the reason for the failed archiving of the message, e.g., the message could not be received from the source 1. Other steps may be performed by the archiving system 2 and/or the message handling system, e.g., the message may be deleted and/or moved from the source 1 to a sent items box, and so on.

If the acquisition of the message was acceptable in step S70, the archiving system 2 may proceed with archiving the message in step S80. If it is determined that the archiving failed in step S90, the archiving tracking module 11 may update archive tracking information accordingly, e.g., increment the "Archive Failed" count by one and identify the reason for failed archive in the Event Data field of the archive tracking record for the message.

If in step S90 the message is successfully archived, the archiving tracking module 11 may update archive tracking information, e.g., increment a "Archived" count included in summary archive tracking information by one and indicate in the ProcessingType field for the message that it was properly archived. Thereafter, in step S100 the archive information for the message may be stored in the archive 3 and the message may be indexed, e.g., to allow for later searching for the message.

It should be appreciated that archive process tracking information may be captured for any suitable archiving processing. Thus, aspects of the invention are not limited in any way by the type of archiving performed, how archive data is stored, etc. Thus, aspects of the invention are not limited to the steps shown in FIG. 8 and/or the order in which the steps are performed. In another aspect, archive tracking information may be presented in a useful fashion, enabling a user to assess the operation of the archiving process, including the operation of rules used, and so on.

Aspects, including embodiments described above, can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of embodiments in accordance with aspects of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention. It should be appreciated that in accordance with several embodiments of the present invention wherein processes are implemented in a computer readable medium, the computer implemented processes may, during the course of their execution, receive input manually (e.g., from a user).

While aspects of the invention has been described with reference to various illustrative embodiments, the invention is not limited to the embodiments described. Thus, it is evident that many alternatives, modifications, and variations of the embodiments described will be apparent to those skilled in the art. Accordingly, embodiments of the invention as set forth herein are intended to be illustrative, not limiting. Various changes may be made without departing from the invention.

What is claimed is:

1. A method for generating information for an electronic message as it is being archived, comprising:
receiving, by a message archiving system, a plurality of electronic messages;

determining, by the message archiving system, whether each of the plurality of electronic messages is designated for archiving or filtering out by applying one or more rules from a first set of rules stored in the message archiving system;

automatically applying, by the message archiving system, at least one rule from a second set of rules stored in the message archiving system to determine an archive location for each of the plurality of electronic messages;

attempting to archive each of the plurality of electronic messages in the archive location;

generating a process record for each of the plurality of electronic messages, each process record comprising a plurality of fields configured to display message details and processing details including: an identification of the electronic message, the archive location for the electronic message, one or more rules from the first set of rules applied to the electronic message during the archival filtering operation, one or more rules from the first set of rules used to determine that the message was selected for archiving, and a time for when the electronic message was attempted to be archived, wherein the plurality of fields enable a user to determine how the electronic message was indentified and selected for archival processing, wherein at least one process record is for an electronic message that was not archived, the at least one process record further including a text narrative explaining a reason why archiving of the electronic message that was not archived was not successful; and displaying the process records for each of the plurality of electronic messages, including the at least one process record for the electronic message that was not archived.

2. The method of claim 1, the process record further comprising one or more of:
   a type of the at least one electronic message;
   sender and recipient address information for the at least one electronic message;
   a number of attachments to the electronic message;
   a size of the at least one electronic message;
   a source of the at least one electronic message;
   an identification number for the at least one electronic message;
   a message handling system from which the at least one electronic message was obtained;
   a server from which the at least one electronic message was obtained; and,
   a processing type for the at least one electronic message indicating whether the at least one electronic message was archived or not archived, and if not archived, indicating whether the at least one electronic message is a duplicate of another previously archived message, whether the at least one electronic message was filtered, or whether archiving the at least one electronic message failed.

3. The method of claim 1, wherein the process record includes information for one or more of the following categories:
   a number of electronic messages processed by the message archiving system;
   a number of electronic messages that were archived;
   a number of duplicate electronic messages;
   a number of filtered messages; and
   a number of messages for which archiving failed.

4. The method of claim 3, wherein the process record includes total numbers of electronic messages for at least one category for a plurality of different time periods.

5. The method of claim 3, wherein the process record includes total numbers of electronic messages for at least one category for a plurality of processing systems for electronic documents.

6. The method of claim 3, wherein the process record includes a total number of electronic messages for at least one category for a plurality of sources of electronic documents.

7. The method of claim 3, wherein the process record includes at least one link that when activated, causes a second display of archive tracking information stored for at least on electronic message associated with the link.

8. The method of claim 7, wherein the at least one link is associated with a displayed number of messages for a particular category.

9. The method of claim 1, wherein the process record is organized based on at least one of the following organization criteria:
   a timeframe during which the archiving was performed for the at least one electronic message;
   a source of the at least one electronic message processed by the message archiving system;
   a server on which the at least one electronic message processed by the message archiving system is stored; and
   an outcome of the archiving process for the at least one electronic message.

10. The method of claim 1, wherein the message archive system also replaces at least a portion of the at least one electronic message with a short cut identifier, further comprising:
    maintaining at least one archive tracking data set that stores information about archiving activities of the message archive system; and
    storing in the at least one archive tracking data set at least some information identifying a first electronic message in response to a determination by the message archive system about whether to archive the first electronic message from among the plurality of electronic messages.

11. The method of claim 10, wherein storing in the at least one archive tracking data set comprises storing information identifying the first electronic message in response to a determination by the message archive system to archive the first electronic message.

12. The method of claim 10, wherein the step of storing in the at least one archive tracking data set comprises storing at least some information identifying at least one rule from the first set of rules applied by the message archive system in making the determination to archive the first electronic message.

13. The method of claim 10, further comprising:
    determining whether the at least one electronic message is a duplicate and wherein the step of storing in the at least one archive tracking data set comprises storing a processing type for the at least one electronic message indicating whether the at least one electronic message was archived or not, and if the at least one electronic message was not archived, including an indication representing whether the message is a duplicate of another previously archived message, the message was filtered out, or archiving of the message failed.

14. A computer program product, comprising a non-transitory computer usable medium having a computer readable program code embodied therein, the computer readable program code configured to be executed to implement a method for generating information for an electronic message as it is being archived, the method comprising:
    receiving, by a message archiving system, a plurality of electronic messages;

determining, by the message archiving system, whether each of the plurality of electronic messages is designated for archiving or filtering out by applying one or more rules from a first set of rules stored in the message archiving system;

automatically applying, by the message archiving system, at least one rule from a second set of rules stored in the message archiving system to determine an archive location for each of the plurality of electronic messages;

attempting to archive each of the plurality of electronic messages in the archive location;

generating a process record for each of the plurality of electronic messages, each process record comprising a plurality of fields configured to display message details and processing details including: an identification of the electronic message, the archive location for the electronic message, one or more rules from the first set of rules applied to the electronic message during the archival filtering operation, one or more rules from the first set of rules used to determine that the message was selected for archiving, and a time for when the electronic message was attempted to be archived, wherein the plurality of fields enable a user to determine how the electronic message was indentified and selected for archival processing, wherein at least one process record is for an electronic message that was not archived, the at least one process record further including a text narrative explaining a reason why archiving of the electronic message that was not archived was not successful; and displaying the process records for each of the plurality of electronic messages, including the at least one process record for the electronic message that was not archived.

15. The computer program product of claim 14, the process record further comprising one or more of:
a type of the at least one electronic message;
sender and recipient address information for the at least one electronic message;
a number of attachments to the electronic message;
a size of the at least one electronic message;
a source of the at least one electronic message;
an identification number for the at least one electronic message;
a message handling system from which the at least one electronic message was obtained;
a server from which the at least one electronic message was obtained; and,
a processing type for the at least one electronic message indicating whether the at least one electronic message was archived or not archived, and if not archived, indicating whether the at least one electronic message is a duplicate of another previously archived message, whether the at least one electronic message was filtered, or whether archiving the at least one electronic message failed.

16. The computer program product of claim 14, wherein the process record includes information for one or more of the following categories:
a number of electronic messages processed by the message archiving system;
a number of electronic messages that were archived;
a number of duplicate electronic messages;
a number of filtered messages; and
a number of messages for which archiving failed.

17. The computer program product of claim 16, wherein the process record includes total numbers of electronic messages for at least one category for a plurality of different time periods.

18. The computer program product of claim 16, wherein the process record includes total numbers of electronic messages for at least one category for a plurality of processing systems for electronic documents.

19. The computer program product of claim 16, wherein the process record includes a total number of electronic messages for at least one category for a plurality of sources of electronic documents.

20. The computer program product of claim 16, wherein the process record includes at least one link that when activated, causes a second display of archive tracking information stored for at least on electronic message associated with the link.

21. The computer program product of claim 20, wherein the at least one link is associated with a displayed number of messages for a particular category.

22. The computer program product of claim 14, wherein the process record is organized based on at least one of the following organization criteria:
a timeframe during which the archiving was performed for the at least one electronic message;
a source of the at least one electronic message processed by the message archiving system;
a server on which the at least one electronic message processed by the message archiving system is stored; and
an outcome of the archiving process for the at least one electronic message.

23. The computer program product of claim 14, wherein the message archive system also replaces at least a portion of the at least one electronic message with a short cut identifier, further comprising:
maintaining at least one archive tracking data set that stores information about archiving activities of the message archive system; and
storing in the at least one archive tracking data set at least some information identifying a first electronic message in response to a determination by the message archive system about whether to archive the first electronic message from among the plurality of electronic messages.

24. The computer program product of claim 23, wherein storing in the at least one archive tracking data set comprises storing information identifying the first electronic message in response to a determination by the message archive system to archive the first electronic message.

25. The computer program product of claim 23, wherein the step of storing in the at least one archive tracking data set comprises storing at least some information identifying at least one rule from the first set of rules applied by the message archive system in making the determination to archive the first electronic message.

26. The computer program product of claim 14, further comprising:
determining whether the at least one electronic message is a duplicate and wherein the step of storing in the at least one archive tracking data set comprises storing a processing type for the at least one electronic message indicating whether the at least one electronic message was archived or not, and if the at least one electronic message was not archived, including an indication representing whether the message is a duplicate of another previously archived message, the message was filtered out, or archiving of the message failed.

* * * * *